(12) United States Patent
Gomez et al.

(10) Patent No.: US 12,553,358 B2
(45) Date of Patent: Feb. 17, 2026

(54) POROSITY VARIATION OF ABRADABLE BASED ON HARDNESS OF MATERIAL

(71) Applicant: RTX Corporation, Farmington, CT (US)

(72) Inventors: Juan Gomez, Farmington, CT (US); Ryan X. Gao, Farmington, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/628,454

(22) Filed: Apr. 5, 2024

(65) Prior Publication Data

US 2025/0314178 A1  Oct. 9, 2025

(51) Int. Cl.
*F01D 11/12* (2006.01)

(52) U.S. Cl.
CPC ........ *F01D 11/122* (2013.01); *F05D 2240/55* (2013.01); *F05D 2300/21* (2013.01); *F05D 2300/50212* (2013.01); *F05D 2300/506* (2013.01); *F05D 2300/514* (2013.01); *F05D 2300/611* (2013.01)

(58) Field of Classification Search
CPC .............. F01D 11/122; F05D 2240/55; F05D 2300/21; F05D 2300/50212; F05D 2300/506; F05D 2300/514; F05D 2300/61
See application file for complete search history.

(56) References Cited

U.S. PATENT DOCUMENTS

| | | | |
|---|---|---|---|
| 6,235,370 B1 | 5/2001 | Merrill et al. | |
| 6,863,999 B1 | 3/2005 | Sudre et al. | |
| 11,060,178 B2 | 7/2021 | Ben Salah et al. | |
| 11,827,986 B2* | 11/2023 | Landwehr | C04B 41/89 |
| 2007/0065672 A1* | 3/2007 | Bhatia | C23C 30/00 |
| | | | 427/372.2 |
| 2014/0220324 A1* | 8/2014 | Strock | C23C 28/3215 |
| | | | 427/446 |
| 2015/0354394 A1 | 12/2015 | Leblanc | |
| 2018/0320270 A1* | 11/2018 | Nardi | C23C 28/3215 |
| 2019/0093497 A1* | 3/2019 | Ndamka | C04B 41/5024 |
| 2019/0360351 A1* | 11/2019 | Walston | F01D 11/122 |

(Continued)

FOREIGN PATENT DOCUMENTS

| | | |
|---|---|---|
| CN | 117247276 A | 12/2023 |
| CN | 117403172 A | 1/2024 |
| FR | 3044702 A1 | 6/2017 |

OTHER PUBLICATIONS

European Patent Office Search Report dated Apr. 16, 2025 issued in corresponding application 25168654.9.

*Primary Examiner* — J. T. Newton
(74) *Attorney, Agent, or Firm* — Millen, White, Zelano & Branigan P.C.; Ryan R. Pool

(57) ABSTRACT

A blade outer air seal includes a center web having a radially inner face and a radially outer face, at least one mounting arm extending from the radially outer face, and a coating disposed on the radially inner face. The coating includes an environmental barrier coating layer and an abradable layer disposed on the environmental barrier layer. The abradable layer has a Mohs hardness of 3.5 to 7.5 and the porosity of the abradable layer is chosen in view of the Mohs hardness, which significantly improves the durability of the abradable layer. A gas turbine engine and a method of protecting a blade outer air seal are also disclosed.

14 Claims, 3 Drawing Sheets

(56) References Cited

U.S. PATENT DOCUMENTS

| | | | |
|---|---|---|---|
| 2020/0055789 A1* | 2/2020 | Smyth | C04B 41/4543 |
| 2021/0108533 A1* | 4/2021 | Shi | F01D 11/14 |
| 2021/0140327 A1* | 5/2021 | Bianchi | C04B 41/522 |
| 2021/0277792 A1* | 9/2021 | Strock | C23C 28/44 |
| 2022/0106888 A1 | 4/2022 | Shi et al. | |
| 2022/0282633 A1* | 9/2022 | Fradet | C23C 4/11 |
| 2022/0306472 A1 | 9/2022 | Yu et al. | |
| 2023/0089114 A1* | 3/2023 | Fradet | F01D 11/122 |
| | | | 415/173.4 |
| 2023/0296029 A1* | 9/2023 | Joost | C04B 41/87 |
| | | | 415/173.4 |

\* cited by examiner

POROSITY VARIATION OF ABRADABLE BASED ON HARDNESS OF MATERIAL

BACKGROUND

This application relates to the use of coatings on a blade outer air seal.

Gas turbine engines typically include a fan delivering air into a bypass duct as propulsion air, and into a core engine. The core engine air moves into a compressor section where it is compressed and delivered into a combustor. The air is mixed with fuel and ignited in the combustor and passed downstream over turbine rotors driving them to rotate. The turbine rotors in turn rotate the fan and compressor rotors.

Improving the efficiency of gas turbine engines is important. To maximize the energy extraction from the volume of the products of combustion passing through the turbine rotors, a blade outer air seal ("BOAS") is placed radially outwardly of turbine blades to minimize blade tip clearance and block the flow of products of combustion from avoiding the turbine blades.

There is a need for BOAS coating with improved temperature and environmental resistance and improved rub performance for use in the operating conditions in a gas turbine engine.

SUMMARY OF THE INVENTION

A blade outer air seal according to an exemplary embodiment of this disclosure includes a center web having a radially inner face and a radially outer face, at least one mounting arm extending from the radially outer face, and a coating disposed on the radially inner face. The coating includes an environmental barrier coating layer and thereon an abradable layer disposed on the environmental barrier layer. The abradable layer has is selected to have a predetermined hardness, which corresponds to a Mohs Hardness Scare range of about 4 to about 7. It has been found that not only a specific material is needed to provide particles for the abradable layer that meets the predetermined harness values, but a corresponding porosity is also chosen, which combination of choice in each particular case has been found to significantly improve the durability of the abradable layer.

In a further example of the foregoing, a blade outer air seal, comprises:
 a center web having a radially inner face and a radially outer face;
 at least one mounting arm extending from the radially outer face; and
 a coating disposed on the radially inner face, the coating comprising:
  a bond coat layer,
  an environmental barrier coating layer, and
  an abradable layer disposed on the environmental barrier layer, which abradable layer contains particles of an abradable material,
  wherein the abradable layer has:
   a Mohs hardness of 3.5 to up to less than 4.5, and a porosity of 15% to 40%,
   a Mohs hardness of 4.5 to up to less than 5.5, and a porosity of 20% to 40%,
   a Mohs hardness of 5.5 to up to less than 6.5, and a porosity of 22% to 40%, or
   a Mohs hardness of 6.5 to 7.5, and a porosity of 25% to 40%.

In any of the embodiments disclosed herein concerning a blade outer air seal, wherein the abradable layer can have a graded porosity wherein a porosity of 15 to 25% is present at a depth where 15% to 20% of rub interaction is expected to take place and 22 to 40% is present at a depth where 80 to 85% of rub interaction is expected to take place.

In any of the embodiments disclosed herein concerning a blade outer air seal, the abradable layer can have
 a Mohs hardness of 3.5 to up to less than 4.5, and a porosity of 15% to 40%,
 a Mohs hardness of 4.5 to up to less than 5.5, and a porosity of 20% to 40%,
 a Mohs hardness of 5.5 to up to less than 6.5, and a porosity of 22% to 40%, or
 a Mohs hardness of 6.5 to 7.5, and a porosity of 25% to 40%;
and
 wherein the difference in the coefficient of thermal expansion CTE of the abradable layer and the radially inner face of the blade outer air seal is less than 50 percent based on the CTE of the ceramic matrix composite (CMC) structural material;
and
 wherein the melting point of the abradable layer is above 1,550° C.

In any of the embodiments disclosed herein concerning a blade outer air seal, the abradable layer can comprise hafnon, YbDS or YbPO$_4$.

In any of the embodiments disclosed herein, the difference in the coefficient of thermal expansion (CTE) of the abradable layer and the radially inner face of the blade outer air seal can be less than 50 percent based on the CTE of the CMC structural material.

In any of the embodiments disclosed herein concerning the a blade outer air seal, the melting point of the abradable layer can be above 1,550° C.

In any of the embodiments disclosed herein concerning the a blade outer air seal, the porosity of the environmental barrier coating layer can be less than about 5%, and the environmental barrier coating layer can include at least one refractory metal oxide, which can be selected from HfSiO$_4$ and ZrSiO$_4$.

In a further exemplary embodiment, a gas turbine engine, can comprise:
 a turbine section arranged along a central engine axis, the turbine section having a turbine with at least one blade rotatable around the central engine axis, the at least one blade having a tip; and
 at least one blade outer air seal arranged radially outward from the tip and attached to an engine static structure, the blade outer air seal including:
  a center web having a radially inner face and a radially outer face;
  at least one mounting arm extending from the radially outer face, and
  a coating disposed on the radially inner face, the coating comprising:
   a bond coat layer,
   an environmental barrier coating layer, and
   an abradable layer disposed on the environmental barrier layer, which abradable layer contains particles of an abradable material,
   wherein the abradable layer has:
    a Mohs hardness of 3.5 to up to less than 4.5, and a porosity of 15% to 40%,
    a Mohs hardness of 4.5 to up to less than 5.5, and a porosity of 20% to 40%,
    a Mohs hardness of 5.5 to up to less than 6.5, and a porosity of 22% to 40%, or a Mohs hardness of 6.5 to 7.5, and a porosity of 25% to 40%.

In any of the embodiments disclosed herein concerning the gas turbine engine, the abradable layer can have a graded porosity wherein a porosity of 5 to 25% is present at a depth where 15% to 20% of rub interaction is expected to take place and 22 to 40% is present at a depth where 80 to 85% of rub interaction is expected to take place.

In any of the embodiments disclosed herein concerning the gas turbine engine, the abradable layer can have
- a Mohs hardness of 3.5 to up to less than 4.5, and a porosity of 15% to 40%,
- a Mohs hardness of 4.5 to up to less than 5.5, and a porosity of 20% to 40%,
- a Mohs hardness of 5.5 to up to less than 6.5, and a porosity of 22% to 40%, or
- a Mohs hardness of 6.5 to 7.5, and a porosity of 25% to 40%;

and
wherein the difference in the coefficient of thermal expansion CTE of the abradable layer and the radially inner face of the blade outer air seal is less than 50 percent based on the CTE of the CMC structural material;

and
wherein the melting point of the abradable layer is above 1,550° C.

In any of the embodiments disclosed herein concerning the gas turbine engine, the abradable layer can comprise hafnon, YbDS or YbPO$_4$.

In any of the embodiments disclosed herein concerning the gas turbine engine, the difference in the coefficient of thermal expansion CTE of the abradable layer and the radially inner face of the blade outer air seal is less than 50 percent based on the CTE of the CMC structural material.

In any of the embodiments disclosed herein concerning the gas turbine engine, the melting point of the abradable layer can be above 1,550° C.

In any of the embodiments disclosed herein concerning the gas turbine engine, the porosity of the environmental barrier coating layer can be less than about 5%, and the environmental barrier coating layer can include at least one refractory metal oxide, which can be selected from HfSiO$_4$ and ZrSiO$_4$.

In a further exemplary embodiment, a method of protecting a blade outer air seal, comprises:
on a radially inner face of a blade outer air seal, applying a coating, the coating comprising
a bond coat layer,
an environmental barrier coating layer, and
an abradable layer disposed on the environmental barrier layer, which abradable layer contains particles of an abradable material,
wherein the abradable layer has:
a Mohs hardness of 3.5 to up to less than 4.5, and a porosity of 15% to 40%,
a Mohs hardness of 4.5 to up to less than 5.5, and a porosity of 20% to 40%,
a Mohs hardness of 5.5 to up to less than 6.5, and a porosity of 22% to 40%, or
a Mohs hardness of 6.5 to 7.5, and a porosity of 25% to 40%.

In any of the embodiments disclosed herein concerning the method of protecting a blade outer air seal, the abradable layer can haves a graded porosity wherein a porosity of 5 to 25% is present at a depth where 15% to 20% of rub interaction is expected to take place and 22 to 40% is present at a depth where 80 to 85% of rub interaction is expected to take place.

In any of the embodiments disclosed herein concerning the method of protecting a blade outer air seal, the abradable layer can have
- a Mohs hardness of 3.5 to up to less than 4.5, and a porosity of 15% to 40%,
- a Mohs hardness of 4.5 to up to less than 5.5, and a porosity of 20% to 40%,
- a Mohs hardness of 5.5 to up to less than 6.5, and a porosity of 22% to 40%, or
- a Mohs hardness of 6.5 to 7.5, and a porosity of 25% to 40%;

and
wherein the difference in the coefficient of thermal expansion CTE of the abradable layer and the radially inner face of the blade outer air seal is less than 50 percent based on the CTE of the CMC structural material;

and
wherein the melting point of the abradable layer is above 1,550° C.

In any of the embodiments disclosed herein concerning the method of protecting a blade outer air seal, the abradable layer can comprise hafnon, YbDS or YbPO$_4$.

In any of the embodiments disclosed herein concerning the method of protecting a blade outer air seal, the difference in the coefficient of thermal expansion (CTE) of the abradable layer and the radially inner face of the blade outer air seal can be less than 50 percent based on the CTE of the CMC structural material.

In any of the embodiments disclosed herein concerning the method of protecting a blade outer air seal, the melting point of the abradable layer can be above 1,550° C.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
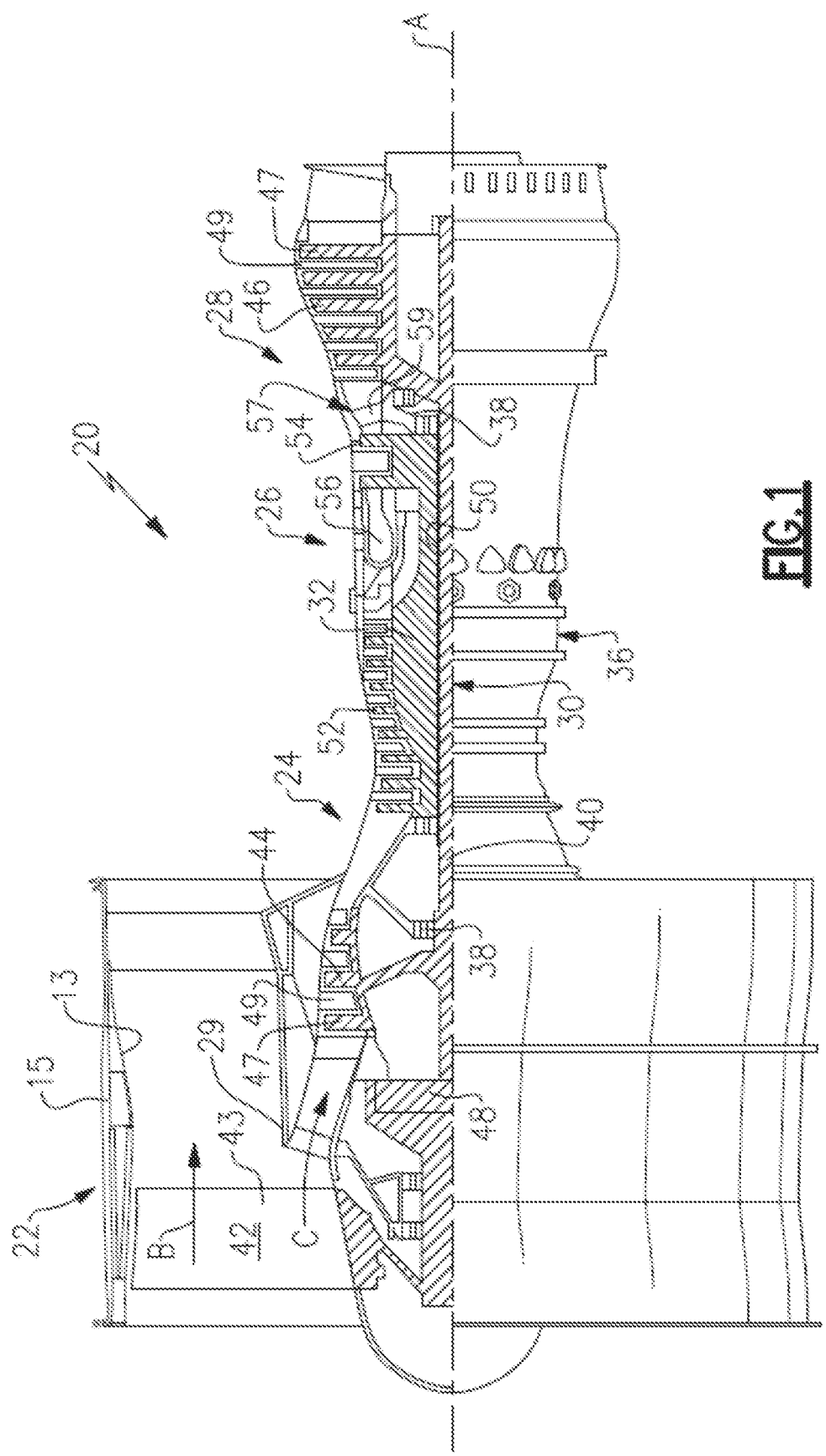
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
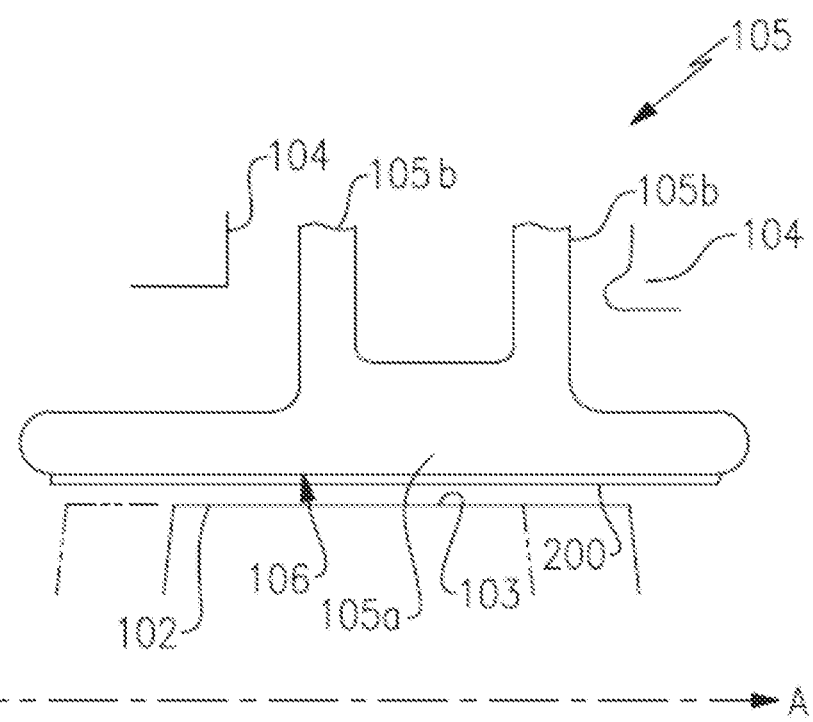
FIG. 2 shows a turbine section of the gas turbine engine of FIG. 1.

FIG. 2 shows a turbine section 28 having rotating turbine blades 102 with a radially outer tip 103. A vane is positioned upstream of the turbine blade 102. In one example the turbine blade 102 is a blade of the high pressure turbine 54 (FIG. 1). A blade outer air seal (BOAS) 105 is positioned radially outwardly of the tip 103 with respect to a central engine axis. A plurality of BOAS (not shown) are arranged circumferentially round the central engine axis. The BOAS 105 has a center web 105a and mounting arms 105b extending from the center web for mounting the BOAS to the engine 20 static structure 104. The center web 105a has a radially inner face 106 (where "radially inner" is in reference to the central engine axis A) and a radially outer face from which the mounting arms 105b extend. The abradable coating system 200 includes all the subsequent protective coating layers specified in FIG. 3. As the blade 102 expands during engine operation it rubs into the abradable system 200 generating an air tight seal in axial direction so all the combustion gases flow thought the turbine stages increasing efficiency.

In one example, the BOAS 105 is formed out of ceramic matrix composite materials ("CMCs") or a monolithic ceramic. A CMC material is comprised of one or more ceramic reinforcement plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcements and is formed of a single material. Example monolithic ceramics include silicon-containing ceramics, such as silicon carbide (SiC) or silicon nitride (Si3N4).

The radially inner face 106 may sometimes rub against the blade 102 tip 103 while the engine 20 is operating. Accordingly, many BOAS 105 include an abradable coating on the radially inner face 106 to accommodate the rubbing. In some examples the tip 103 includes an abrasive coating that couples with the abradable coating on the BOAS 105.

Usually, the entire radially inner face 106 of the BOAS includes this abradable coating. In a single-coating system, where the abradable coating is the only coating, other coatings that may provide environmental protection or temperature resistance to the BOAS, 105 are not used at the radially inner face 106. The abradable coatings are high-porosity coatings that may provide a measure of environmental and/or temperature protection, but not to the extent of dense environmental barrier coatings or thermal barrier coatings.

However, only discrete areas of the radially inner face 106 that are positioned radially outward from the blade 102 tips 103 benefit from the abradable coating applied thereon. As such, an option is to provide an abradable coating only to such areas that benefit from the presence of the abradable coating.

In general, there is a direct relationship between the porosity of a coating and how abradable it is. That is, a coating with a higher porosity will be more abradable. More abradable coating provide an improved abrasion couple in the case of tip 103 rub against the BOAS 105. However, highly abradable coatings are susceptible to environmental attack, which is a particular concern for the BOAS 105 which is exposed to hot combustion gases during operation of the engine 20. Of particular concern is attack by calcia-magnesia-alumino-silicate (CMAS), which can build up on the BOAS 105 in a molten state and infiltrate the pores of the abradable coating and accelerate failure of the coating by introducing unwanted localized mechanical stresses into the material. Moreover, CMAS is known to undergo a process of reactive crystallization which can produce unwanted reaction products that can also limit the lifespan of the coating. Additionally, high velocity particles in the gas path of an engine cause considerable erosion damage to coatings, especially to highly porous coatings. The erosion of the coating leads to premature failure of the coated turbine engine part.

Figure 3:
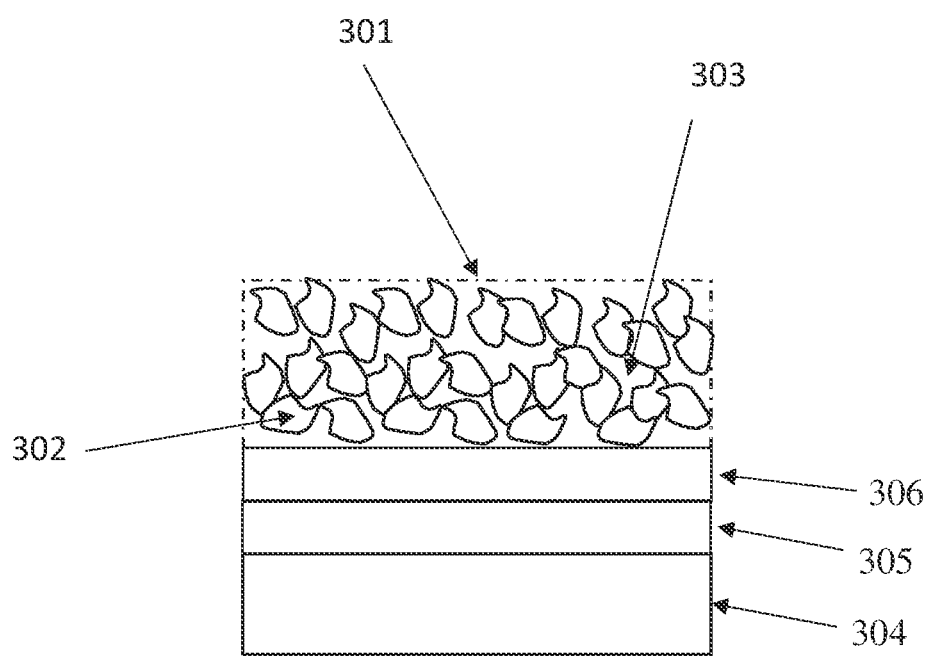
FIG. 3 shows the layer structure of a coating system with an abradable layer thereon. Note that FIG. 3 is upside down relative to FIG. 2.

To that end, a multilayer coating, shown in FIG. 3, is disposed on a ceramic matrix composite CMC 304 material, which can be, for example, the BOAS 105, which has both abradable and CMAS-resistant properties as will be discussed herein. The CMC material is, for example, a SiC material.

Disposed directly on the CMC 304, for example, on the BOAS radially inner face 106, is a bond coat 305. The bond coat may be a silicon dioxide-based bond coat 305. Generally the bond coat is compatible with the material of the CMC 304, e.g., BOAS 105, chemically and has similar coefficient of thermal expansion to the CMC 304, e.g., BOAS 105.

Bond coats are known in the art and generally include gettering particles and diffusive particles. The gettering particles can react with oxidant particles, such as oxygen or water, that could diffuse into the coating. In this way, the gettering particles could reduce the likelihood of those oxidant particles reaching and oxidizing the underlying CMC 304, e.g., BOAS 105. The gettering particles thus function as an oxygen and moisture diffusion barrier to limit the exposure of the underlying CMC 304, for example, BOAS 105, to oxygen and/or moisture from the surrounding environment. The bond coat may optionally also include diffusive particles. Without being bound by any particular theory, the diffusive particles enhance oxidation and moisture protection by diffusion of some or all of the composition constituents to the outer surface of the bond coat and forming a sealing layer that seals the underlying CMC 304, e.g., BOAS 105 from oxygen/moisture exposure. Additionally, the diffusive particles may include cationic metal species which can diffuse into the gettering particles to enhance oxidation stability of the gettering particle material. Further, the diffusion behavior of the diffusive particles may operate to seal any microcracks that could form in the bond coat 305. Sealing the micro-cracks could prevent oxygen from infiltrating the bond coat, which further enhances the oxidation resistance of the barrier layer.

Disposed on the bond coat 305 is an environmental barrier coating (EBC) 306. The EBC 306 is not reactive with CMAS and dense to avoid water vapor and CMAS glass permeation. In particular, in some examples, the EBC includes at least one refractory metal oxide such as $HfSiO_4$ or $ZrSiO_4$, which are known to limit reactivity of the EBC 306 with CMAS. Without being bound by any particular theory, the constant dissolution of Hf and Zr into CMAS glass promotes re-precipitation of Zircon/Hafnon particles at EBC-relevant operating temperatures.

Disposed on the EBC 306 is a CMAS-transparent porous or columnar abradable layer 301, which contains particles 302 and contains pores between the particles 303. That is, molten CMAS can move through the abradable layer 301 by infiltrating its pores 303 and dissolving particles without generating instantaneous reactive crystallization. The abradable layer 301 has a higher porosity than the EBC 306. In a particular example, the porosity of the abradable layer 301 is initially (e.g., at the time of application on the EBC 306) between about 15 and 40 percent (which can be more narrowly selected based on the other characteristics of the abradable material, e.g., its hardness) and the porosity of the EBC 306 is less than about 5 percent. As discussed above, molten CMAS tends to build up on the BOAS and will infiltrate into the pores 303 of the abradable layer 301 over time. Due to capillary action, the CMAS will tend to infiltrate towards the EBC 306 and slowly fill the abradable layer 301 from its interface with the EBC 306 to its outermost surface. Over time, CMAS will reduce the porosity of the abradable layer 301 as it infiltrates the pores, however, because the abradable layer 301 has a high porosity to begin with, it will still maintain its abradable nature and accommodate tip 103 rubbing. It is important to note that the base chemistry of the abradable layer and possible CMAS reaction, dissolution or intrinsic crystallization products should have CTE in the ranges matching of SiC material (difference between CTE mismatch should be less than 50 percent) to minimize stress build up after thermal cycling. Moreover, as noted above in some examples the tip 103 may have an abrasive coating that would mitigate any reduction in abradability of the abradable layer 301.

As CMAS infiltrates into the abradable layer 301, it may have a self-healing effect in that the molten CMAS can fill in any cracks that form in the abradable layer 301. The CMAS will eventually recrystallize and become part of the abradable layer 301. In this way, absorption of the CMAS by the abradable layer 301 mitigates the CMAS from having unwanted interactions with the EBC 306, which as discussed above improves the longevity of the coating 301 and BOAS 105. Therefore, the coating accommodates CMAS infiltration into the abradable layer 301, and mitigates the deleterious effects of CMAS, while still providing an abradable surface for the CMC material, e.g., BOAS 105, and protecting the underlying layers and BOAS 105 from the CMAS.

The abradable layer 301 includes materials that meet the requisite properties, e.g., a Mohs hardness of ranges in between 7.5 to 3.5 coupled with a porosity variation up to 40% down to 15% by volume respectively. CTE mismatch with no more than 50% in difference with respect to the CMC structural material. Such materials are selected from rare earth silicates, alkaline earth silicates, alkaline earth aluminosilicates, rare earth aluminates, garnets, spinels, rare earth phosphates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, BSAS, i.e., Barium-strontium aluminosilicate and combinations thereof. Noted is that some of these material alone may not meet the requisite properties alone even though listed therein, but may do so when in a combination with other given options. In a particular example, the abradable layer 301 includes at least one of hafnon, zircon and/or mullite. In an embodiment, the abradable material includes or is YbDS, which is ytterbium disilicate.

The abradable layer can be applied onto a CMC 304 material, for example, to the radially outer face 106, on top of the layers 305 and 306 by any suitable method for the particular materials selected as is known in the art, such as spray techniques. Post-application processing techniques can then be performed, such as to smooth the surface of the abradable component.

In one aspect, the selection of abradable material is coupled to the chosen porosity. Particularly, note that the selection is in one aspect made based on the hardness of the material, which is a primary factor concerning the ability of the material to serve as an abradable material.

Harness is measured by the Mohs scale of mineral hardness, which is a qualitative ordinal scale, from 1 to 10, characterizing scratch resistance of minerals through the ability of a harder material to scratch softer materials. To exemplify, the following table provides some insight into the hardness values of exemplary materials.

| Mohs hardness | Mineral | Other materials |
| --- | --- | --- |
| 1 | talc | |
| 2 | gypsum | ~2.2 to 2.5 fingernail |
| 3 | calcite | ~3.2 to 3.5 copper penny |
| 4 | fluorite | |
| 5 | apatite | ~5.1 pocketknife; ~5.5 glass plate |
| 6 | orthoclase | ~6.5 steel needle or nail |
| 7 | quartz | ~7.0 streak plate |
| 8 | topaz | ~8.5 masonry drill bit |
| 9 | corundum | |
| 10 | diamond | |

One may think that the harder the material, the more ability it would have to serve as a suitable abradable material for the protection of CMC materials, but there are tradeoffs of hardness versus other characteristics. For example, a material having a hardness of 9 or 10 may cause too much damage to the material it contacts, may introduce both physical fatigue or cracks, or thermal damage due to the accumulation of heat at contacting surfaces.

A suitable range for Mohs hardness of the abradable coating system for the protection of CMC materials is within the range of about 3.5 to 7.5, including 4 to 7, 4 to 6, 4 to 5, 5 to 6, 5 to 7, and 6 to 7, as well as specific values of 3.5, 4, 4.5, 5, 5.5, 6, 6.5, 7, and 7.5 and any range that can be made with values disclosed herein serving as end points of the range.

In general, the range could be a 3.5 Mohs material could have a lowest porosity of 15% up to 40% and a 7.5 Mohs material needs to be at least 25% and up to 40%. This means, as a way of looking at it, is that, for example, in a single layer embodiment, the minimum porosity increases with the Mohs hardness of the material, i.e., the Mohs harness increases from 3.5 to 7.5 while the porosity increases from 15% to 25%, which relationship is linear or about linear, meaning the deviation from linear is less than ±10% or even less than ±10%.

This relationship serves as a guide to select the appropriate material for the abrasive layer from among known options, examples of which are provided herein. For example, one can select an appropriate hardness, chose a porosity that meets the minimum porosity requirements for the hardness selected, as well as meet the melting point requirements and the coefficient of thermal expansion matching requirements as disclosed herein.

With this approach, one can significantly reduce the damage to turbine blades since the material where rub interaction is expected to take place is appropriately selected to protect the turbine blade, which typically is made of some nickel based super alloy that can be much more easily damaged than the abrasive layer where the rub interaction would be expected to take place.

As evident from the above, in conjunction with the selection of a material with a particular hardness, it has been found that there is a relationship with the selected porosity and the durability of the abrasive layer. In this regard, the porosity chosen generally increases with increasing harness of the material chosen, and surely the minimum porosity requirements do. The durability increase is significant, for example, the life of a coated part may be extended as a result of assuring that at least 70%, or a least 80% or at least 90%, or 95% or even 99%, of the rub interaction wear is taken by the abradable coating instead of the blade tip.

For example, a choice for hafnon as an abradable material, which has a harness of approximately 7.5 would lead to the selection of the porosity of 25% to 40%.

As another example, the selection of REPO$_4$, where RE is Yb, Y, Sc and up to Gd, meaning (La, Ce, Pr, Nd, Pm, Sm, Eu and Gd), where the hardness values are lower, e.g., about 4 to about 4.5, the selection of porosity is in the range of 15% to 40%, including 18% to 32%, 20% to 30%, 20% to 25%, 22% to 28%, 24% to 26%, including optionally targeting lower porosities when the hardness values are lower, e.g., 15% to 25%, 18% to 22%, and any narrower ranges or specific values within these explicitly disclosed ranges.

There are many materials that meet these harness values, including various natural minerals as well as man-made materials, including anorthite, garnet, BSAS, i.e., Barium-strontium aluminosilicate, and mullite, which have hardness values of 6 to 6.5 and 6 to 7, respectively. A further narrowing option for the selection of suitable abradable materials is the other relevant properties of the material such as its coefficient of thermal expansion CTE as well as its melting point. As noted above, the CTE of the CMC material protected, e.g., of SiC material, is usually closely matched to the CTE of the abradable material to minimize the stresses amongst these materials when exposed to various temperatures. For example, the difference between CTE mismatch should be less than 50 percent, less than 45%, less than 40%, less than 35%, less than 30%, less than 25%, less than 20%, less than 15%, less than 10% as well as less than 5%, e.g., less than 1, 2 or 3%.

A further characteristic to consider is the melting point of the abradable material, which depends on the heat exposure expected for the coated CMC material. Ideally, the abradable material would have a melting point above the expected heat levels to which the abradable layer is exposed. Such expected heat levels may be up to 1,600° C., up to 1,550° C., or up to 1,500° C.

The exemplary materials mentioned above, i.e., anorthite and mullite, as well as $REPO_4$, as defined above, including $YPO_4$, have the following characteristics.

| Material | Hardness (Mohs) | CTE | Melting point (° C.) |
|---|---|---|---|
| Anorthite | 6-6.5 | 4.8-5.6 | 1553 |
| Mullite | 6-7 | 4.5-5.5 | 1840 |
| $REPO_4$, where (RE = Yb, Y, up to Gd) | 4-4.5 | 5.8 | 1900 |

The material of the abradable layer is typically in the form of particles, that have irregular shapes. However, the shape of the particles may be close to circular or elliptical or may have jagged irregular edges. The size of the feedstock spray particles, meaning their average diameter, is in the range of 15 to 200 µm, but can be selected to be any particular narrower range within this broader range, for example, as nonlimiting options, 15 to 50 µm, 25 to 50 µm, 30 to 60 µm, 50 to 100 µm, 75 to 100 µm, 100 to 150 µm, 125 to 175 µm, or 105 to 200 µm. Additionally, wider particle size distribution could be used to generate larger porosities i.e. 15-200 µm.

Another processing method to achieve a desired or predetermined porosity, e.g., high porosity, is by mixing polyester or polymer-based powder(s) into the material of the abradable layer that is to be baked out after spraying, leaving behind large globular pores at locations occupied by the polyester powder(s). The selection of the sizes and amounts of polyester powder(s) leads to the predetermined amounts of pores of predetermined sizes. Other options to achieve a desired or predetermined porosity is by the selection of the morphology of the feedstock spray powder by the use of globular shells or discontinuous globular particles.

Noted also is that during the use of the turbine, sintering of the abrasive layer will occur, which leads to the loss of some porosity of the abrasive layer, especially where most of the rub interaction would take place. An approach to minimize the effect of such an occurrence, is to use a graded porosity for the abrasive layer.

Therefore, in a further embodiment, the abradable layer has a graded porosity. For example, the grading may be present in a single layer, or may be present by providing several layers, each having their own specific porosities.

In the single layer graded porosity system, the abradable layer may be sprayed from a single mix of material to form the abradable layer, where the use of varying amounts of, e.g., polyester powders, at different thicknesses controls the amount of porosity.

For example, the porosity may be lower at a depth where 15% to 20%, or 15% or 20% of the rub interaction is expected to take place, for example, in each case, 5 to 25%, 5 to 22%, 5 to 20%, 10 to 25%, 10 to 22%, 10 to 20%, 15 to 25%, 15 to 22%, 15 to 20%, and may be higher at a depth where 80 to 85%, or 80% or 85% of the rub interaction is expected to take place, for example, in each case, 25 to 40%, 22 to 40% or 30 to 40%. Rub interactions could be expected to occur in very thin interactions down to 25 µm and up to very deep rub interactions reaching even 1000 µm.

The porosity in a graded porosity system may be stepwise at the disclosed thicknesses, or may be a continuously changing value within the disclosed ranges. For example, at the portion of the depth where 80 to 85% of the rub interaction is expected to take place the porosity should be higher, i.e., which is at the portion of the abradable layer that is further away from the EBC layer. And in conjunction with that, the porosity of the abradable layer closer to the EBC layer can be lower.

The depth of rub interactions is highly dependent on a variety of factors, e.g., the type of aircraft on which the turbine engine is installed, e.g., commercial or military, the size, weight and the exact type of aircraft, and even on some extraneous factors such as the way it is used. However, keeping all this in mind, there is nevertheless a general approach for determining an expected area of rub interaction concerning any particular engine considered. Therefore, a predetermined expected area/depth of rub interaction can be determined.

As a way of an example, generally commercial engines on large aircrafts are expected to have a max area or depth of rub interaction of 380 µm. This means that 80% of the rub interaction would take place at 0.8×380=304 µm, and this is where the porosity in a stepwise system may be higher. And the remaining 20% of depth, i.e., the 76 µm of the abradable layer closest to the EBC layer can have a lower porosity.

Further noted is that the porosity of the EBC layer below the abradable layer is preferably low, e.g., having a 5% max porosity, e.g., 4%, 3%, 2 5, 1% or even lower 0.5%, 0.2% or 0.1%, if any.

Alternatively, a graded porosity may be achieved by providing several layers of abradable materials, each having different porosities. For example, the same type of porosities may be achieved as in the single layer systems disclosed above. In a multi-layer abradable material layer, there is an option to also control not only the porosities of the various layers, but also to select different materials having different hardnesses for each layer.

Examples of single layer graded porosity systems:

Graded Porosity Example with Hafnon Coating (6.5 to 7.5 Hardness)

Low thickness EBC (max 5% porosity) and graded porosity from 5 to 25% at the depth where 15% of the rub interaction will take place, followed by a full porosity system 25 to 40% porosity layer at the thickness location where 85% of rub interaction is expected. The layer can be deposited on one continuous spray layer by varying the amount of polyester as thickness increases.

YbDS Chemistry Example (5.5-6.5 Hardness):

Low thickness EBC (max 5% porosity) and graded porosity from 5 to 22% at the depth where 15% of the rub interaction will take place, followed by a full porosity system 22 to 40% porosity layer at the thickness location where 85% of rub interaction is expected. The layer can be deposited on one continuous spray layer by varying the amount of polyester as thickness increases.

Different Chemistry System:

Fully dense EBC (hafnon or YbDS or other EBC) followed by $YbPO_4$ abradable (3.5-4.5 hardness) with porosity of 15-25% deposited at the thickness where 20% percent of the rub interaction is expected followed by full porosity (25% to 40%) at the thickness area where 80% of the rub interaction is expected.

As used herein, the term "about" and "approximately" have the typical meanings in the art, however in a particular example "about" and "approximately" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A blade outer air seal, comprising:
a center web having a radially inner face and a radially outer face; and at least one mounting arm extending from the radially outer face, wherein the center web and at least one mounting arm are made of a ceramic matrix composite (CMC) structural material; and
a coating disposed on the radially inner face, the coating comprising:
a bond coat layer,
an environmental barrier coating layer, and
an abradable layer disposed on the environmental barrier layer,
which abradable layer contains particles of an abradable material, wherein the abradable layer has:
a Mohs hardness of 3.5 to up to less than 4.5, and a porosity of 15% to 40%,
a Mohs hardness of 4.5 to up to less than 5.5, and a porosity of 20% to 40%,
a Mohs hardness of 5.5 to up to less than 6.5, and a porosity of 22% to 40%, or
a Mohs hardness of 6.5 to 7.5, and a porosity of 25% to 40%;
wherein the abradable layer and the radially inner face of the blade outer air seal have a difference in coefficient of thermal expansion (CTE) that is less than 50 percent based on the CTE of the CMC structural material.

2. The blade outer air seal of claim 1, wherein the abradable layer has a graded porosity wherein a porosity of up to 40% is present at a depth of 76 µm to 304 µm.

3. The blade outer air seal of claim 1, wherein the abradable layer comprises hafnon, YbDS or YbPO$_4$.

4. The blade outer air seal of claim 1, wherein the melting point of the abradable layer is above 1,550° C.

5. The blade outer air seal of claim 1, wherein the porosity of the environmental barrier coating layer is less than about 5%, and wherein the environmental barrier coating layer includes at least one refractory metal oxide, which is selected from HfSiO$_4$ and ZrSiO$_4$.

6. A gas turbine engine, comprising:
a turbine section arranged along a central engine axis, the turbine section having a turbine with at least one blade rotatable around the central engine axis, the at least one blade having a tip; and
at least one blade outer air seal arranged radially outward from the tip and attached to an engine static structure, the blade outer air seal including:
a center web having a radially inner face and a radially outer face and at least one mounting arm extending from the radially outer face, wherein the center web and at least one mounting arm are made of a ceramic matrix composite (CMC) structural material; and
a coating disposed on the radially inner face, the coating comprising:
a bond coat layer,
an environmental barrier coating layer, and
an abradable layer disposed on the environmental barrier layer, which abradable layer contains particles of an abradable material,
wherein the abradable layer has:
a Mohs hardness of 3.5 to up to less than 4.5, and a porosity of 15% to 40%,
a Mohs hardness of 4.5 to up to less than 5.5, and a porosity of 20% to 40%,
a Mohs hardness of 5.5 to up to less than 6.5, and a porosity of 22% to 40%, or
a Mohs hardness of 6.5 to 7.5, and a porosity of 25% to 40%;
wherein the abradable layer and the radially inner face of the blade outer air seal have a difference in coefficient of thermal expansion (CTE) that is less than 50 percent based on the CTE of the CMC structural material.

7. The gas turbine engine of claim 6, wherein the abradable layer has a graded porosity wherein a porosity of up to 40% is present at a depth of 76 µm to 304 µm.

8. The gas turbine engine of claim 6, wherein the abradable layer comprises hafnon, YbDS or YbPO$_4$.

9. The gas turbine engine of claim 6, wherein the melting point of the abradable layer is above 1,550° C.

10. The gas turbine engine of claim 6, wherein the porosity of the environmental barrier coating layer is less than about 5%, and wherein the environmental barrier coating layer includes at least one refractory metal oxide, which is selected from HfSiO$_4$ and ZrSiO$_4$.

11. A method of protecting a blade outer air seal, comprising:
applying a coating on a radially inner face of the blade outer air seal wherein the blade outer air seal is made of a ceramic matrix composite (CMC) structural material, the coating comprising
a bond coat layer,
an environmental barrier coating layer, and
an abradable layer disposed on the environmental barrier layer, which abradable layer contains particles of an abradable material, wherein the abradable layer has:
a Mohs hardness of 3.5 to up to less than 4.5, and a porosity of 15% to 40%,
a Mohs hardness of 4.5 to up to less than 5.5, and a porosity of 20% to 40%,
a Mohs hardness of 5.5 to up to less than 6.5, and a porosity of 22% to 40%, or
a Mohs hardness of 6.5 to 7.5, and a porosity of 25% to 40%
wherein the abradable layer and the radially inner face of the blade outer air seal have a difference in coefficient of thermal expansion (CTE) that is less than 50 percent based on the CTE of the CMC structural material.

12. The method of protecting a blade outer air seal of claim 11, wherein the abradable layer has a graded porosity wherein a porosity of up to 40% is present at a depth of 76 µm to 304 µm.

13. The method of protecting a blade outer air seal of claim 11, wherein the abradable layer comprises hafnon, YbDS or YbPO$_4$.

14. The method of protecting a blade outer air seal of claim 11, wherein the melting point of the abradable layer is above 1,550° C.

* * * * *